(12) United States Patent
Weiskopf et al.

(10) Patent No.: US 7,818,261 B2
(45) Date of Patent: Oct. 19, 2010

(54) METHOD AND SYSTEM FOR MANAGING LICENSES TO CONTENT

(75) Inventors: David N. Weiskopf, Kirkland, WA (US); Erling Aspelund, Seattle, WA (US)

(73) Assignee: Corbis Corporation, Seattle, WA (US)

( * ) Notice: Subject to any disclaimer, the term of this patent is extended or adjusted under 35 U.S.C. 154(b) by 591 days.

(21) Appl. No.: 11/425,335

(22) Filed: Jun. 20, 2006

(65) Prior Publication Data
US 2007/0168513 A1    Jul. 19, 2007

Related U.S. Application Data

(60) Provisional application No. 60/760,182, filed on Jan. 18, 2006.

(51) Int. Cl.
*G06F 21/00* (2006.01)
(52) U.S. Cl. .............................. 705/59; 705/1; 705/26; 705/51; 380/231; 713/177; 713/193; 713/201
(58) Field of Classification Search .............. 705/1–59; 380/231; 713/177, 193, 201
See application file for complete search history.

(56) References Cited

U.S. PATENT DOCUMENTS

| | | | | |
|---|---|---|---|---|
| 5,671,412 | A | * | 9/1997 | Christiano ............... 707/104.1 |
| 6,226,618 | B1 | * | 5/2001 | Downs et al. ................... 705/1 |
| 6,611,812 | B2 | * | 8/2003 | Hurtado et al. ............... 705/26 |
| 6,633,877 | B1 | * | 10/2003 | Saigh et al. ......................... 1/1 |
| 6,766,305 | B1 | * | 7/2004 | Fucarile et al. ............... 705/51 |
| 7,020,304 | B2 | | 3/2006 | Alattar et al. |
| 7,031,471 | B2 | | 4/2006 | Stefik et al. |
| 7,047,241 | B1 | | 5/2006 | Erickson |

(Continued)

OTHER PUBLICATIONS

Markova, Sonja, "Rightsline, Inc.," Keiretsu News, Apr. 2004, Issue 200404, 5 pages, http://keiretsunews.com/issue/200404/rightsline.html (accessed Oct. 18, 2007).

(Continued)

*Primary Examiner*—Pierre Eddy Elisca
*Assistant Examiner*—Shahid Kamal
(74) *Attorney, Agent, or Firm*—Frommer Lawrence & Haug LLP; John W. Branch

(57) ABSTRACT

Process for enabling a content provider and its users to easily manage licenses for intended uses for selected or provided content. Licensing information for content previously provided to a user or acquired by the content provider, a digital fingerprint, and/or a digital identifier are employed to uniquely identify a particular instance of the selected/provided content and manage licenses to use this content Once the selected content is provided for processing, the invention can notify the user of at least one of four conditions: (1) a user is currently licensed for at least one type of use for the selected content; (2) if a previous license to the selected content is expired, a current license does not include the selected use, or the user doesn't have or has an expired license to use the selected content, and identify steps to obtain a current license for at least one type of use; (3) if a license to use the selected content is not available from the content provider; and (4) identify substantially similar content that is available from the content provider for a license for at least one type of the intended use for one or more of conditions (1), (2), and (3).

35 Claims, 6 Drawing Sheets

U.S. PATENT DOCUMENTS

| | | | |
|---|---|---|---|
| 7,051,086 B2 | 5/2006 | Rhoads et al. | |
| 7,054,462 B2 | 5/2006 | Rhoads et al. | |
| 7,065,787 B2* | 6/2006 | Ganesan et al. | 726/21 |
| 7,068,811 B2 | 6/2006 | Powell et al. | |
| 7,068,812 B2 | 6/2006 | Powell et al. | |
| 7,072,487 B2 | 7/2006 | Reed et al. | |
| 7,072,490 B2 | 7/2006 | Stach | |
| 7,076,082 B2 | 7/2006 | Sharma | |
| 7,076,084 B2 | 7/2006 | Davis et al. | |
| 7,086,666 B2 | 8/2006 | Richardson | |
| 7,088,844 B2 | 8/2006 | Hannigan et al. | |
| 7,092,953 B1 | 8/2006 | Haynes | |
| 7,095,871 B2 | 8/2006 | Jones et al. | |
| 7,098,931 B2 | 8/2006 | Patterson et al. | |
| 7,099,492 B2 | 8/2006 | Rhoads | |
| 7,099,849 B1 | 8/2006 | Reeder et al. | |
| 7,103,197 B2 | 9/2006 | Rhoads | |
| 7,111,168 B2 | 9/2006 | Lofgren et al. | |
| 7,111,170 B2 | 9/2006 | Hein et al. | |
| 7,113,596 B2 | 9/2006 | Rhoads | |
| 7,113,614 B2 | 9/2006 | Rhoads | |
| 7,113,615 B2 | 9/2006 | Rhoads et al. | |
| 7,116,781 B2 | 10/2006 | Rhoads | |
| 7,123,740 B2 | 10/2006 | McKinley | |
| 7,127,744 B2 | 10/2006 | Levy | |
| 7,136,838 B1* | 11/2006 | Peinado et al. | 705/59 |
| 7,277,870 B2* | 10/2007 | Mourad et al. | 705/51 |
| 7,398,556 B2* | 7/2008 | Erickson | 726/27 |
| 2002/0012432 A1* | 1/2002 | England et al. | 380/231 |
| 2002/0062290 A1* | 5/2002 | Ricci | 705/59 |
| 2002/0091645 A1 | 7/2002 | Tohyama | |
| 2002/0138441 A1* | 9/2002 | Lopatic | 705/59 |
| 2002/0161718 A1 | 10/2002 | Coley et al. | |
| 2003/0028488 A1* | 2/2003 | Mohammed et al. | 705/59 |
| 2003/0037006 A1* | 2/2003 | Maruyama et al. | 705/59 |
| 2003/0083999 A1* | 5/2003 | Ramachandran et al. | 705/59 |
| 2003/0084341 A1* | 5/2003 | Ramachandran et al. | 713/201 |
| 2003/0217011 A1* | 11/2003 | Peinado et al. | 705/59 |
| 2003/0233561 A1* | 12/2003 | Ganesan et al. | 713/193 |
| 2004/0039916 A1* | 2/2004 | Aldis et al. | 713/177 |
| 2004/0088541 A1 | 5/2004 | Messerges et al. | |
| 2004/0117483 A1 | 6/2004 | Singer et al. | |
| 2005/0021995 A1 | 1/2005 | Lal et al. | |

OTHER PUBLICATIONS

Cox, I.J. and Linnartz. J.P., Some general methods for tampering with watermarks, IEEE Trans. on Selected Areas of Communications, 15,4, 587-593 IEEE (1998).

Cox, I.J. and Linnartz, J.P., Public watermarks and resistance to tampering, IEEE International Converence on Image Processing, CD-ROM Proc. Linnartz, IEEE (1997).

Miller, Matt et al., A review of watermarking principles and practices, Published in Digital Signal Processing in Multimedia Systems, Ed. K.K. Parhi and T. Nishitani, Marcell Dekker Inc., 461-485, (1999).

Lin, Ching-Yung, Watermarking and Digital Signature Techniques for Multimedia Authentication and Copyright Protection, Submitted in partial fulfillment of the requirements for the degree of Doctor of Philosophy in the Graduate School of Arts and Sciences, Columbia University, 2000.

Content Protection System Architecture: A Comprehensive Framework for Content Protection. Intel Corporation, IBM Corporation, Matsushita Electric Industrial Co., Ltd. Toshiba Corporation, Feb. 17, 2000, Revision 0.81.

Angwin, Julia, A Problem for Hot Web Outfits: Keeping Pages Free From Porn, Wall Street Journal, May 16, 2006, p. 1.

* cited by examiner

Provider-Enabled – FIG. 3

METHOD AND SYSTEM FOR MANAGING LICENSES TO CONTENT

CROSS-REFERENCE TO RELATED APPLICATIONS

This application claims the benefit of U.S. Provisional Application Ser. No. 60/760,182 filed on Jan. 18, 2006, the benefit of the earlier filing date of which is hereby claimed under 35 U.S.C. 119(e) and further incorporated by reference.

FIELD OF THE INVENTION

The invention is generally directed to providing access to content, and more particularly, to enabling a user to manage one or more licenses to use selected content for a particular purpose.

BACKGROUND OF THE INVENTION

Content can include, but is not limited to, images, pictures, video, illustrations, drawings, graphics, symbols, text, and audio recordings. This content can be digitized and embodied in an electronic format that can be communicated over a network and/or included in a processor readable media. Typical content users for commercial purposes include advertisers, publishers, media companies, graphic designers, and the like. Additionally, there are several methods for identifying a particular instance of selected content, including comparisons to original content (digital fingerprint), and unique identifiers that are attached to the selected content. The unique identifiers can be included in the header of a file and/or injected into the content itself.

It is often difficult for content users to determine the actual source of content that they currently possess. Also, it can be inconvenient to determine if a content user needs to obtain a license to use selected/possessed content for a particular commercial purpose. Consequently, even good corporate citizens often inadvertently and unintentionally violate their licenses or use content without any licenses at all.

Current methods for verifying license rights for selected content are often labor and time intensive for both the content provider and their customers. Also, typical Digital Rights Management (DRM) solutions negatively impact user workflow and depend on almost non-existent industry standards and co-operation. Additionally, current tagging methods for content can degrade quality and are often easily circumvented with relatively standard editing techniques and tools.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

DETAILED DESCRIPTION OF THE INVENTION

Figure 1:
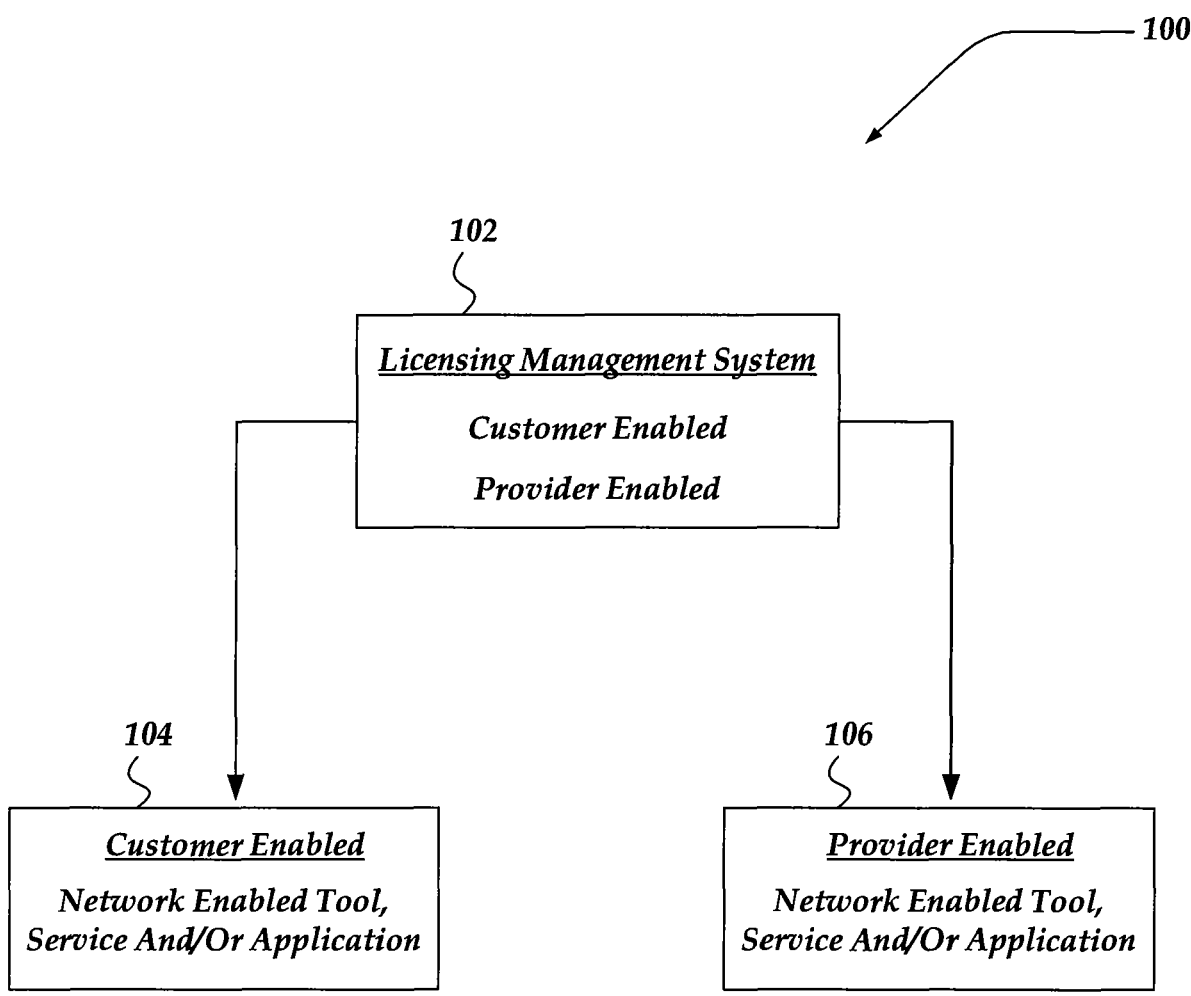
FIG. 1 is a block diagram illustrating an overview of the two primary users of the invention.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods, or devices. Accordingly, the present invention may take the form of an entirely hardware embodiment, an entirely software embodiment or an embodiment combining software and hardware aspects. The following detailed description is, therefore, not to be taken in a limiting sense.

The invention is generally directed to a method and system for enabling a content provider and its users to easily manage licenses for intended uses for selected or provided content. Licensing information for content previously provided to a user or acquired by the content provider, a digital fingerprint, and/or a digital identifier are employed to uniquely identify a particular instance of the selected/provided content and manage licenses to use this content Once the selected content is provided for processing, the invention can notify the user of at least one of four conditions: (1) a user is currently licensed for at least one type of use for the selected content; (2) if a previous license to the selected content is expired, a current license does not include the selected use, or the user doesn't have or has an expired license to use the selected content, and identify steps to obtain a current license for at least one type of use; (3) if a license to use the selected content is not available from the content provider; and (4) identify substantially similar content that is available from the content provider for a license for at least one type of the intended use for one or more of conditions (1), (2), and (3).

Also, although the exemplary embodiment discussed below is generally directed to images, it is understood that the invention may also be employed in a substantially similar way either singly, or in combination with other types of content, e.g., video, pictures, illustrations, drawings, graphics, symbols, text, and audio recordings.

In at least one embodiment, the invention employs a comparison (digital fingerprint) to an original version of the selected content and/or an identifier that uniquely identifies a particular instance of selected content.

In at least one embodiment, the invention employs singly or in combination, sales information and/or licensing information, and the like, from the provider (or some other resource) for the selected content to determine the current status of a user's license (or lack) to use the selected content.

In one embodiment, a content provider is a single entity such as a website, service, or resource that is arranged on a network to provide content to one or more users. In another embodiment, the content provider can be arranged to include one or more websites, services, or resources that are configured to provide content to one or more users.

In one embodiment, the unique identifier can be configured as metadata that is arranged in one or more arrangements, including but not limited to, XMP, EXIF, and IPTC. In yet another embodiment, the unique identifier can be configured as an object such as a smart object, digital object identifier (DOI), and/or a handle. Also, the unique identifier may be included in a header of a file and/or injected into the actual data that characterizes the content. One or more methods may be employed to inject a unique identifier into content contained in a file, including, but not limited to, steganography, watermarking, and hard coding.

In one embodiment, a Handle System is employed as the unique identifier for content. The Handle System provides a resolution service for digital objects over a network, such as the Internet. The arrangement of the Handle System is somewhat similar to a Domain Name System (DNS), except that it is tailored for resolving unique identifier objects instead of uniform resource locators (URLs) for websites. There are several Requests For Comment (RFCs) that explain the specific details of the Handle System, including RFC3650, 3651, and 3652. Additionally, the Handle System can be used to locate repositories that contain objects given their unique handles. Other features of the Handle System include: (1) open, relatively well-defined protocol and data model; (2) infrastructure for application domains, e.g., images, music, digital libraries; (3) interoperability between many different information systems; and (4) a DNS can operate on the Handle System.

In another embodiment, a unique identifier configured as an object is generally arranged as a DOI and/or smart object that provides at least some of the functionality that follows: (1) addressable and resolvable over a network via a resolution system; (2) include a payload that conforms to a metadata description; (3) address is specified by a particular syntax; (4) can invoke a method; and (5) universally operable.

In one embodiment, the digital fingerprinting of content can include initially processing the content to generate relatively unique signatures and one or more probability density functions which are stored in one or more databases. For visual content such as an image, the digital fingerprint's signatures might correspond to the texture, shape, and/or color or the image. Later, the probability density functions for feature vectors could be used with these signatures to identify other copies of the same image that may be identical or somewhat altered, but whose base attributes are discernible. In a somewhat similar way, signatures and probability density functions can be generated for digitally fingerprinting non-visual content such as audio recordings.

In one embodiment, the user can manually provide or select content for processing, including but not limited to: (1) dragging and dropping the selected content into a visual container, such as a window, folder, icon, and the like; (2) identifying a folder, directory, or virtual lightbox where at least one instance of the selected content resides; (3) selecting an integrated feature or a plug-in applet that provides this functionality for another application, such as an editor, digital asset management (DAM) application, and the like; and (4) accessing a link to a web site and/or a service provided over a network. Instances of a user can include the content provider, a customer of the content provider, and/or a third party content provider. Also, each user can indicate designees that can have full or some lesser amount of access to the functionality of the invention. In one embodiment, the functionality of the invention can be provided as a service to the user, and in other embodiments the invention is provided to the user as an application.

In one embodiment, hierarchical levels of trust may be employed to determine which employees or third party contractors of a customer/user are enabled to view the presence, or lack thereof, of licenses to the selected content. For example, the invention can be configured so that managers are advised of the particular details of an out of date or missing license to the selected content. In this case, other employees and/or third party contractors could be directed to contact their manager in regard to a license to the selected content.

In yet another embodiment, the user can arrange the invention to automatically pre-process at least a portion of content stored in at least one location, e.g., a folder, directory, and virtual lightbox, for at least one current license. Once the invention determines that content at the location does not have at least one license, the invention can notify the user in one or more ways, including, an email, text message, alert message, pop-up window, audio tone, visual flag, and the like.

FIG. 1 illustrates a block diagram of overview 100 of features of licensing management system 102. As shown, system 102 can be arranged for providing access for two or more types of users, e.g., a customer or a content provider. If features of content provider embodiment 106 is selected, the system provides at least one of a network enabled tool, service, and/or an application for access by the content provider and/or its designees. Somewhat similarly, if customer embodiment 104 is selected, the system provides a network enabled tool, service, and/or an application for access by the customer and/or its designees.

Figure 2:
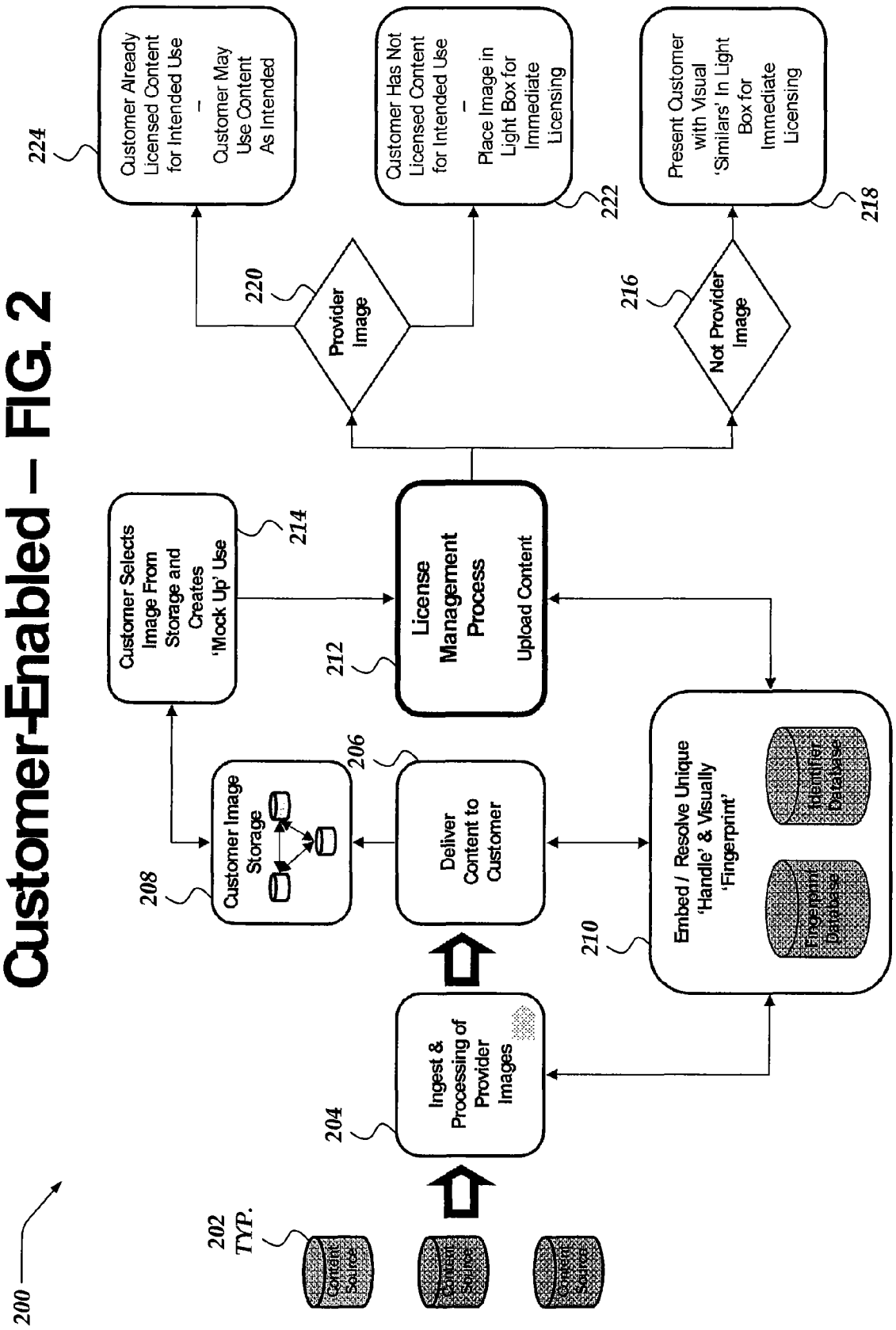
FIG. 2 is a block diagram showing an overview of a user enabled system.

FIG. 2 illustrates a block diagram of system overview 200 of a customer enabled arrangement of the invention for image based content. As shown, source content from a variety of different sources 202 is processed and ingested for a content provider at block 204. This process can be adapted for different sources that provide their content in different ways, such providing an electronic file on a processor readable media and/or over a wired and/or wireless network. Source content can also be provided on physical media such as a photograph, book, poster, painting, and the like. The "physical" content is processed into an electronic format. At block 210, a digital fingerprint value and/or a unique identifier is associated with each item of the source content.

The provider enables the source content to be provided to the customer at block 206, where copies of the source content is stored at customer storage space 208 for later use. At block 214, the customer can select particular copies of the source content in their storage space 208 for a particular intended use, such as a mock up advertisement. Subsequently, the customer can provide the content to license management process 212 that employs at least one of a digital fingerprint and unique identifier provided from block 210 to uniquely compare the provided content to the source content. If the license management process 212 determines that a license to the provided content is managed by the content provider, a determination is made at decision block 220 as to whether the customer has licensed the provided content. If true, the process moves to block 224 where a current license to the selected copy of the source content or the provided content for the intended use is identified and the customer is notified that it is cleared for the intended use. However, if the customer has not licensed the selected source or provided content, the process flows to block 222 where this content is stored and the customer is notified that a license needs to be acquired for the intended use. Further, the invention advises the customer on steps to obtain a valid license and indicates the cost to do so. These steps may include completing a questionnaire, and/or communicating with a representative of the content provider. Also, the invention can cause the selected/provided content to be moved to a location, such as a virtual container, folder, website, virtual lightbox, and the like, that is arranged to generally store content that is waiting for a license for a particular intended use.

However, if it is determined that a license to the selected/provided content is not managed by the content provider, the process advances to decision block 216 and then to block 218 where the customer is advised that a valid license to the selected/provided content is unavailable and suggests substantially similar source content that is available for a valid license for the intended use.

Additionally, information regarding licenses and intended uses for selected/provided content is gathered by the content provider to determine those customers that could potentially benefit from particular product offerings, and/or contact with the provider's representative. Also, this information could help identify those customers that are the most and/or least diligent about obtaining a valid license. In one embodiment, the use of content by the least diligent customers might be more closely scrutinized than other customers, and the most diligent customers might be rewarded for their behavior.

In another embodiment, the process proceeds in substantially the same manner as discussed above except for a determination is made as to whether or not the customer has acquired a license to the selected/provided content, and if so, the current and/or expired licenses are displayed to the customer. For this embodiment, providing the intended use for the selected content is not a predicate to determining if a license to the content exists for the customer. Additionally, although this exemplary embodiment is directed to image content, the invention is not so limited, and can be applied to at least the other types of content discussed in greater detail elsewhere in the specification.

Figure 3:
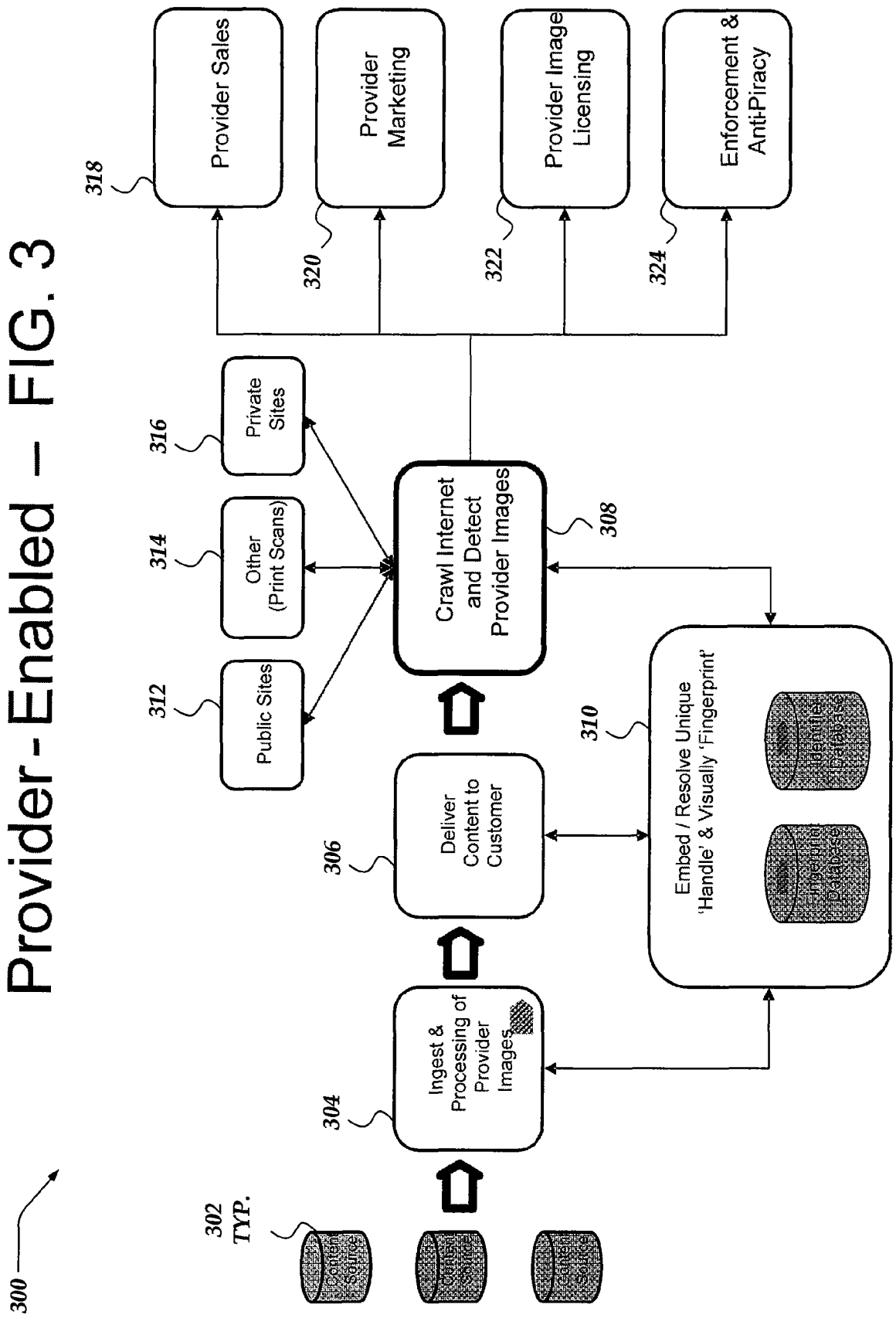
FIG. 3 is a block diagram illustrating an overview of a provider enabled system.

FIG. 3 illustrates a provider enabled arrangement of the invention that is somewhat similar to the process illustrated in FIG. 2, albeit different in several ways. As shown, source content from a variety of different sources 302 is processed/ingested at block 304 by a content provider. This intake process can be adapted for different sources that provide source content in different ways, such providing an electronic file on a processor readable media or over a network. Source content can also be provided on physical media such as a photograph, book, poster, painting, and the like. The "physical" source content is processed into an electronic format. At block 310, a digital fingerprint and/or a unique identifier is associated with each copy of the source content. A copy of the selected source content is provided to the customer at block 306.

At block 308, the process is arranged to crawl one or more public sites 312, private sites 316, or other sites 314, on one or more networks, where digital fingerprints and/or unique identifiers are used to identify stored copies of content whose licenses are managed by the content provider. The process employs licensing and/or sales information to determine if the site owner is licensed to use the identified content for its current use. This license compliance information can be provided to one or more resources including, but not limited to, content provider sales representatives 318, content provider marketing representatives 320, content provider licensing representatives 322, and content provider's anti-piracy enforcement and compliance representatives 324. Additionally, although this exemplary embodiment is directed to image content, the invention is not so limited, and can be applied to at least the other types of content discussed in greater detail elsewhere in the specification.

It will be understood that each block of the above flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Operating Environment

Figure 4:
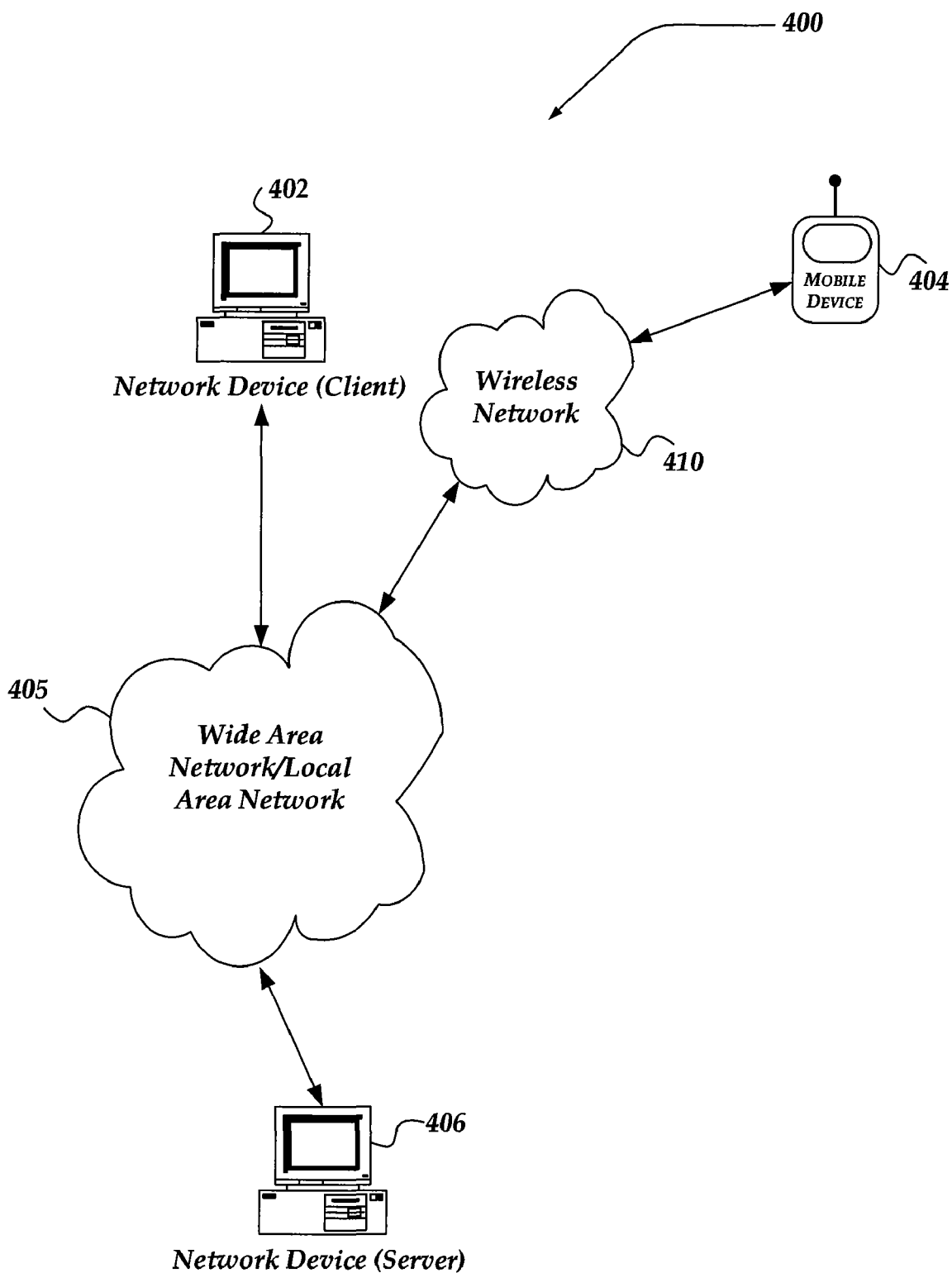
FIG. 4 is a block diagram showing an illustrative operating environment.

FIG. 4 shows components of an exemplary environment in which the invention may be practiced. Not all the components may be required to practice the invention, and variations in the arrangement and type of the components may be made without departing from the spirit or scope of the invention. As shown, system 400 of FIG. 1 includes local area networks ("LANs")/wide area networks ("WANs") 405, wireless network 410, server network device 406, client network device 402, and mobile device 404.

Generally, client network device 402 may include virtually any computing device capable of receiving and sending a message over a network, such as network 405, wireless network 410, and the like, to and from another computing device, such as server network device 406, mobile device 404, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client device 402 also may be any computing device that is capable of connecting using a wired or wireless communication medium such as a PDA, POCKET PC, laptop computer, wearable computer, and any other device that is equipped to communicate over a wired and/or wireless communication medium.

Client network device 402 may include a browser application that is configured to receive and to send web pages, web-based messages, and the like. The browser application may be configured to receive and display graphics, text, multimedia, and the like, employing virtually any web based language, including Standard Generalized Markup Language (SMGL), such as HyperText Markup Language (HTML), and so forth.

Client network device 402 may further include a client application that enables it to perform a variety of other actions, including, communicating a message, such as through a Short Message Service (SMS), Multimedia Message Service (MMS), instant messaging (IM), internet relay chat (IRC), mIRC, Jabber, and the like, between itself and another computing device. The browser application, and/or another application, such as the client application, a plug-in application, and the like, may enable client device 402 to communicate content to another computing device.

Mobile device 404 represents one embodiment of a client device that is configured to be portable. Thus, mobile device 404 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile device 104 typically ranges widely in terms of capabilities and features. For example, a cell phone may have a numeric keypad and a few lines of monochrome LCD display on which only text may be displayed. In another example, a web-enabled remote device may have a touch sensitive screen, a stylus, and several lines of color LCD display in which both text and graphics may be displayed. Moreover, the web-enabled remote device may include a browser application enabled to receive and to send wireless application protocol messages (WAP), and the like. In one embodiment, the browser application is enabled to employ a Handheld Device Markup Language (HDML), Wireless Markup Language (WML), WMLScript, JavaScript, and the like, to display and send a message.

Mobile device 404 also may include at least one client application with components that that are configured to communicate content with another computing device, such as another mobile device, network device, and the like. The client application may include a capability to provide and receive textual content, graphical content, audio content, and the like. The client application may further provide information that identifies itself, including a type, capability, name, identifier, and the like. The information may also indicate a content format that mobile device 404 is enabled to employ. Such information may be provided in a message, or the like, sent to server network device 406, and the like.

Mobile device 404 may be configured to communicate a message, such as through a Short Message Service (SMS), Multimedia Message Service (MMS), instant messaging (IM), internet relay chat (IRC), mIRC, Jabber, and the like, between another computing device, such as server 406, and the like. However, the present invention is not limited to these message protocols, and virtually any other message protocol may be employed.

Wireless network 410 is configured to couple mobile device 404 and its components with WAN/LAN 402. Wireless network 410 may include any of a variety of wireless sub-networks that may further overlay stand-alone ad-hoc networks, and the like, to provide an infrastructure-oriented connection for mobile device 404. Such sub- networks may include mesh networks, Wireless LAN (WLAN) networks, cellular networks, and the like.

Wireless network 410 may further include an autonomous system of terminals, gateways, routers, and the like connected by wireless radio links, and the like. These connectors may be configured to move freely and randomly and organize themselves arbitrarily, such that the topology of wireless network 410 may change rapidly.

Wireless network 410 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile device 404 with various degrees of mobility. For example, wireless network 410 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 410 may include virtually any wireless communication mechanism by which information may travel between mobile device 104 and another computing device, network, and the like.

Network 405 is configured to couple server 406 and its components with other computing devices, including, client network device 402, server network 406, and through wireless network 410 to mobile device 404. Network 405 is enabled to employ any form of computer readable media for communicating information from one electronic device to another. Also, network 405 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 405 includes any communication method by which information may travel between server 406 and another computing device.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Illustrative Mobile Client Environment

Figure 5:
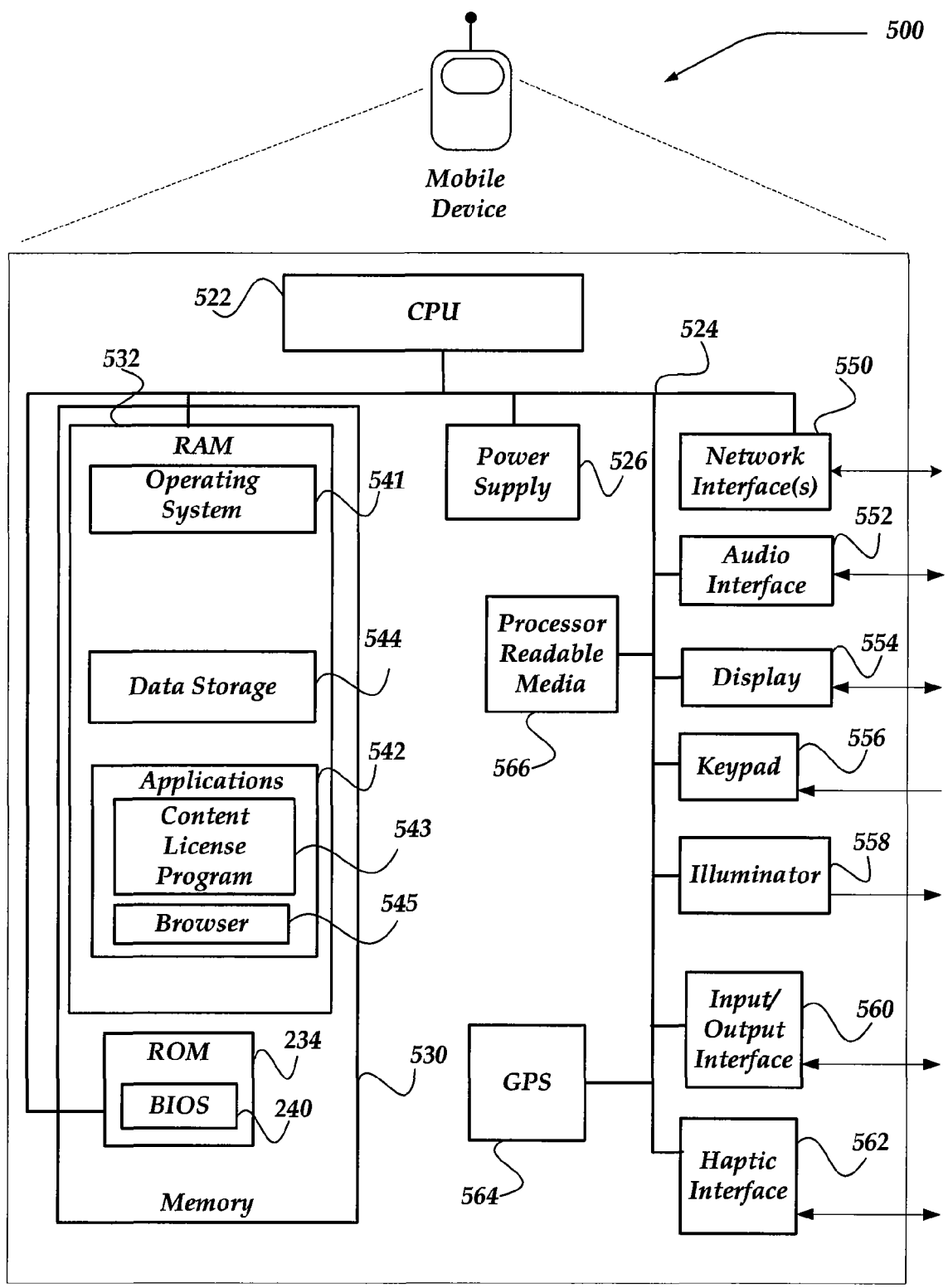
FIG. 5 shows one embodiment of a mobile device that may be included in a system implementing the invention.

FIG. 5 shows one embodiment of mobile device 500 that may be included in a system implementing the invention. Mobile device 500 may include many more or less components than those shown in FIG. 5. However, the components shown are sufficient to disclose an illustrative embodiment for practicing the present invention. Mobile device 500 may represent, for example, mobile devices 404 of FIG. 4.

As shown in the figure, mobile device 500 includes a processing unit (CPU) 522 in communication with a mass memory 530 via a bus 524. Mobile device 500 also includes power supply 526, one or more network interfaces 550, audio interface 552, display 554, keypad 556, illuminator 558, input/output interface 560, haptic interface 562, optional global positioning systems (GPS) receiver 564, and processor readable media 566. Media 566 may include, but is not limited to, hard discs, floppy disks, memory cards, optical discs, and the like. Power supply 526 provides power to enable the operation of mobile device 500. A rechargeable or non-rechargeable battery may be used to provide this power. The power may also be provided by an external power source, such as an AC adapter or a powered docking cradle that supplements and/or recharges a battery.

Mobile device 500 may optionally communicate with a base station (not shown), or directly with another computing device. Network interface 550 includes circuitry for coupling mobile device 500 to one or more networks, and is arranged for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 550 is sometimes known as a transceiver, transceiving device, or network interface card (NIC).

Audio interface 552 is arranged to produce and receive audio signals such as the sound of a human voice. For example, audio interface 552 may be coupled to a speaker and microphone (not shown) to enable telecommunication with others and/or generate an audio acknowledgement for some action. Display 554 may be a liquid crystal display (LCD), gas plasma, light emitting diode (LED), or any other type of display used with a computing device. Display 554 may also include a touch sensitive screen arranged to receive input from an object such as a stylus or a digit from a human hand.

Keypad 556 may comprise any input device arranged to receive input from a user. For example, keypad 556 may include a push button numeric dial, or a keyboard. Keypad 556 may also include command buttons that are associated with selecting and sending content. Illuminator 558 may provide a status indication and/or provide light. Illuminator 558 may remain active for specific periods of time or in response to events. For example, if illuminator 558 is active, it may backlight the buttons on keypad 556 and stay on while the client device is powered. Also, illuminator 558 may backlight these buttons in various patterns when particular actions are performed, such as dialing another device, such as a mobile device or wired telephone device (not shown). Illuminator 558 may also cause light sources positioned within a transparent or translucent case of the mobile device to illuminate in response to actions.

Mobile device 500 also comprises input/output interface 560 for communicating with external devices, such as a headset, or other input or output devices not shown in FIG. 5. Input/output interface 560 can utilize one or more communication technologies, such as USB, infrared, Bluetooth™, or the like. Haptic interface 562 is arranged to provide tactile feedback to a user of the client device. For example, the haptic interface may be employed to vibrate mobile device 500 in a particular way when another user of a computing device is calling.

Optional GPS transceiver 564 can determine the physical coordinates of mobile device 500 on the surface of the Earth, which typically outputs a location as latitude and longitude values. GPS transceiver 564 can also employ other geo-positioning mechanisms, including, but not limited to, triangulation, assisted GPS (AGPS), E-OTD, CI, SAI, ETA, BSS or the like, to further determine the physical location of mobile device 500 on the surface of the Earth. It is understood that under different conditions, GPS transceiver 564 can determine a physical location within millimeters for mobile device 500; and in other cases, the determined physical location may be less precise, such as within a meter or significantly greater distances.

Mass memory 530 includes a RAM 532, a ROM 534, and other storage means. Mass memory 530 illustrates another example of computer storage media for storage of information such as computer readable instructions, data structures, program modules or other data. Mass memory 530 stores a basic input/output system ("BIOS") 540 for controlling low-level operation of mobile device 500. The mass memory also stores an operating system 541 for controlling the operation of mobile device 500. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 530 further includes one or more data storage 544, which can be utilized by mobile device 500 to store, among other things, applications 542 and/or other data. For example, data storage 544 may also be employed to store information that describes various capabilities of mobile device 500. The information may then be provided to another device based on any of a variety of events, including being sent as part of a header during a communication, sent upon request, or the like. Moreover, data storage 544 may also be employed to store license information regarding one or more types of use for content, or the like. At least a portion of this information may also be stored on a disk drive or other storage medium (not shown) within mobile device 500. Applications 542 may include computer executable instructions which, when executed by mobile device 500, transmit, receive, and/or otherwise process messages (e.g., SMS, MMS, IM, email, and/or other messages), audio, video, and enable telecommunication with another computing device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 542 may further include browser 545 and content license program 543.

Content license program 543 may be configured either individually or in combination with browser 545 to review licenses, and upload and download content items. Program 543 can also enable a customer to purchase a license for at least one type of use for selected content. In one embodiment, content license program 543 enables a user to determine if a license is current, expired, or absent for content that is provided over the network. Various embodiments of the processes for content license program 543 are described in more detail below in conjunction with the specification.

Illustrative Network Device

Figure 6:
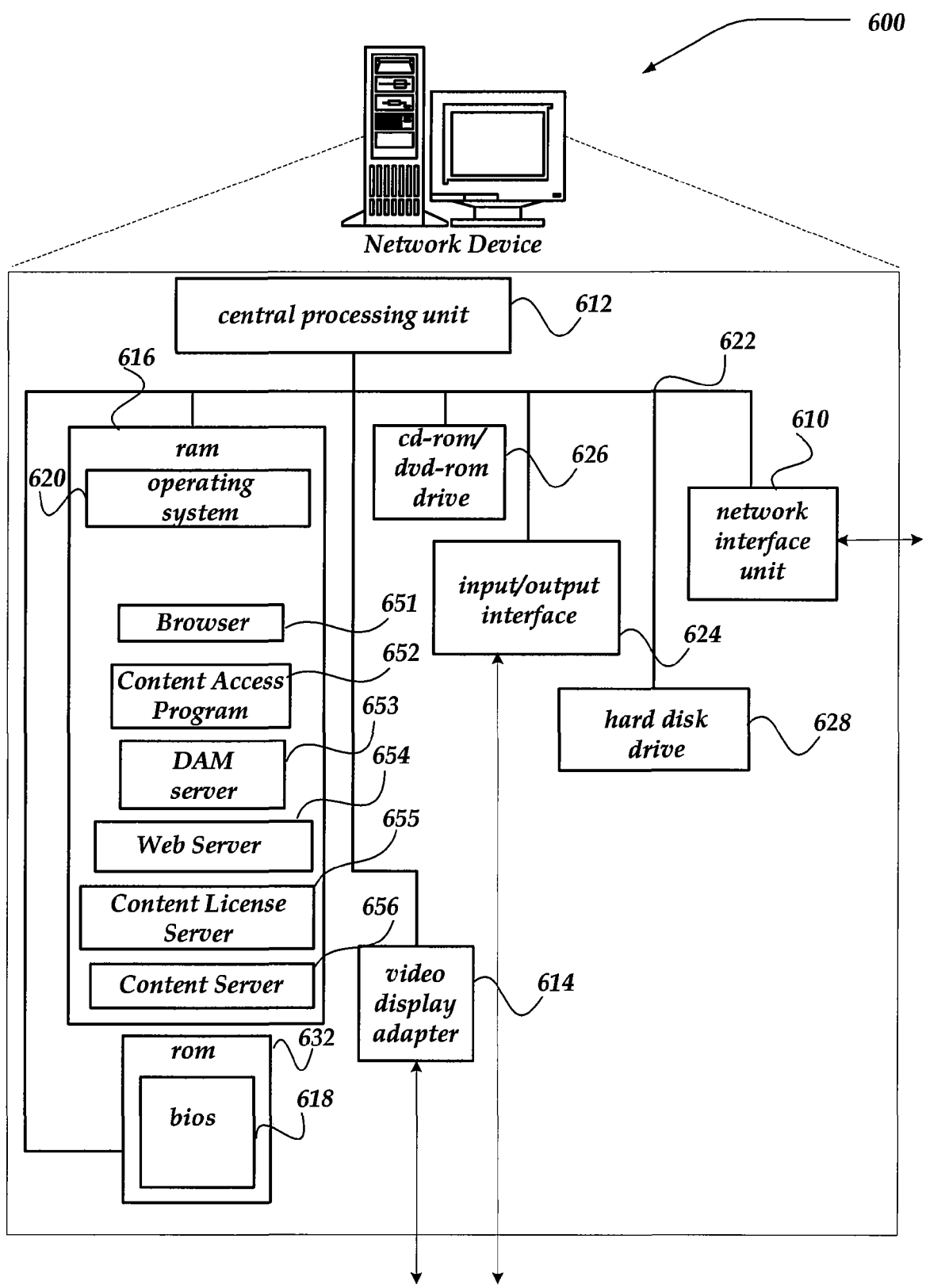
FIG. 6 illustrates one embodiment of a network device that may be included in a system, in accordance with the invention.

FIG. 6 shows one embodiment of a network device, according to one embodiment of the invention. Network device 600 may include many more components than those shown. The components shown, however, are sufficient to disclose an illustrative embodiment for practicing the invention. Network device 600 may be arranged to represent, for example, server network device 406 or client network device 402 of FIG. 4.

Network device 600 includes processing unit 612, video display adapter 614, and a mass memory, all in communication with each other via bus 622. The mass memory generally includes RAM 616, ROM 632, and one or more mass storage devices with processor readable media, such as hard disc drive 628. Other examples of mass storage media include EEPROM, flash memory or other memory technology, CD-ROM, digital versatile disks (DVD) or other optical storage, memory cards, magnetic cassettes, magnetic tape, magnetic disk storage or other magnetic storage devices, or any other medium which can be used to store the desired information and which can be accessed by the network device. The mass memory stores operating system 620 for controlling the operation of network device 600. It is envisioned that any general-purpose or mobile operating system may be employed. Basic input/output system ("BIOS") 618 is also provided for controlling the low-level operation of network device 600. As illustrated in FIG. 6, network device 600 also can communicate with the Internet, or some other communications network, via network interface unit 610, which is constructed for use with various communication protocols including the TCP/IP protocol. Network interface unit 610 is sometimes known as a transceiver, or network interface card (NIC).

The mass memory can also store program code and data. One or more applications 650 can be loaded into mass memory and run on operating system 620. Examples of application programs that may be included are transcoders, schedulers, calendars, database programs, word processing programs, HTTP programs, customizable user interface programs, IPSec applications, encryption programs, security programs, VPN programs, SMS message servers, IM message servers, email servers, account management and the like.

If network device 600 is arranged as a client device, the client applications may include browser 651 and/or content license access program 652. However, if network device 600 is arranged to operate and/or as a server, other serving applications may also be included, such as DAM 653, Web server 654, Content License server 655, Content server 656, and the like. Furthermore, one or more of these serving applications may be arranged on one or more network devices dedicated to providing computing resources.

Content license server 655 may be arranged to receive and process licenses for the intended use for selected and/or provided content. Content Price server 655 can also preprocess license information regarding selected and/or provided content. Generally, information and/or data can be provided for processing/preprocessing/determinations to content license server 655 by one or more other servers, RSS feeds, APIs, applications, scripts, manual edits, third party sources, content providers, and the like.

Content server 656 can be arranged to provide access to content identification information so that the determined licenses can be associated with selected/provided content. Web server 654 may also be arranged to provide information regarding a license to the provided content as a service to users. DAM server 653 may also be arranged to incorporate the license information provided by Content License server 655. Additionally, network device 600 is arranged to enable one or more of the processes described below in conjunction with the specification.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A method for managing the use of content over a network, comprising:

storing at least one of a source digital fingerprint or a source identifier that corresponds to each of a plurality of items of source content, wherein at least one use of a copy of each source content item is licensable;

determining, by a processor, if another identifier included with an item of content is received from a user indicating at least one particular type of use indicated by the user for the item of content, and has an affirmative correspondence to at least one of the stored source identifiers associated with each source content item;

if the determination of the other identifier is negative, determining if another digital fingerprint determined for the received content item is substantially similar to at least one of the source digital fingerprints associated with each source content item;

determining, by a processor, each license previously provided for a user that corresponds to the received content item based on the affirmative correspondence between at least one of the source identifiers and the other identifier or a substantially similar comparison between the source digital fingerprints and the other digital fingerprint; and if a license for the user for the at least one particular type of indicated use for the received content item is determined to be unavailable, determining at least one other source content item that is non-identical to the received content item and that is both substantially equivalent to the received content item and available for licensing for at the least one particular type of indicated use by the user, wherein the determination of the at least one other source content item is based on at least the affirmative correspondence.

2. The method of claim 1, further comprising providing the determined equivalent source content item to the user that accepts a license for at least one type of use for the equivalent source content item.

3. The method of claim 1, further comprising displaying information for the user regarding at least one of type of use for at least one license that is available to the user.

4. The method of claim 1, wherein if the license for the received content is unavailable, further comprises a determination that a correspondence is absent between the source identifiers and another determination of a less than substantially similar comparison between the other identifier and the source digital fingerprints and the other digital fingerprint.

5. The method of claim 1, wherein each determined license includes at least one of:

a current license for the user for at least one type of use for the received content item;

an expired license for the user for at least one type of use for the received content item, wherein further information is provided to the user for renewing at least the expired license; or an absent license for the user for at least one type of use for the received content item.

6. The method of claim 5, further comprising:

offering a renewal to the user for at least one expired license for at least one type of use for the received content item; or offering a new license to the user associated with the absent license for at least one type of use for the received content item.

7. The method of claim 1, wherein the source content item includes at least one of video, picture, illustration, drawing, graphic, symbol, text, or audio recording.

8. The method of claim 1, further comprising enabling at least one of the user or a service to provide or select the received content item and at least one intended use for the received content item.

9. The method of claim 7, further comprising enabling the received content item to be provided by the user, including:
   dragging and dropping a selection of received content item into a virtual container;
   identifying a location for accessing the received content item;
   employing a control of an application to provide the received content item; or
   enabling a service to provide the received content item over a network.

10. The method of claim 1, wherein at least one of the source identifier and the other identifier includes at least one of:
   a resolvable address;
   a metadata payload;
   a universal operability mechanism;
   an addressable syntax; and
   an invokable method.

11. The method of claim 1, further comprising providing license information in at least one manner, including email, text message, alert, pop-up window, audio tone, or visual flag.

12. The method of claim 1, further comprising employing sales information to determine a current status of the user's license for at least one type of use for the received content item.

13. The method of claim 1, further comprising providing hierarchical levels of trust to determine if a representative of the user is enabled to access information regarding at least one license for at least one type of use for the received content item.

14. The method of claim 1, further comprising automatically pre-processing at least a portion of received content item stored in at least one location for at least one license for at least one type of use.

15. A system for managing the use of content over a network, comprising:
   a server for enabling actions, including:
      storing at least one of a source digital fingerprint or a source identifier that corresponds to each of a plurality of items of source content, wherein at least one use of a copy of each source content item is licensable;
      determining if another identifier included with an item of content is received from a user indicating at least one particular type of use indicated by the user for the item of content, and has an affirmative correspondence to at least one of the stored source identifiers associated with each source content item;
      if the determination of the other identifier is negative, determining if another digital fingerprint determined for the received content item is substantially similar to at least one of the source digital fingerprints associated with each source content item;
      determining each license previously provided for a user that corresponds to the received content item based on the affirmative correspondence between at least one of the source identifiers and the other identifier or a substantially similar comparison between the source digital fingerprints and the other digital fingerprint; and
      if at least one license for the user for the at least one particular type of indicated use for the received content item is determined to be unavailable, determining at least one other source content item that is non-identical to the received content item and that is both substantially equivalent to the received content item and available for licensing for the at least one particular type of indicated use by the user, wherein the determination of the at least one other source content item is based on at least the affirmative correspondence; and
   a client for enabling actions, including offering at least one license for at least one type of use to the user for the at least one determined equivalent source content item.

16. The system of claim 15, wherein the client enables further actions comprising providing the determined equivalent source content item to the user that accepts a license for at least one type of use for the equivalent source content item.

17. The system of claim 15, wherein the client enables further actions comprising displaying information for review by the user regarding at least one of type of use for at least one license that is available to the user.

18. The system of claim 15, wherein the client enables further actions including enabling at least one user to provide or select the received content item and at least one intended use for the received content item.

19. The system of claim 15, wherein the server enables further actions comprising:
   determining a current license for the user for at least one type of use of the received content item;
   determining an expired license for the user for at least one type of use of the received content item, wherein further information is provided to the user for renewing at least the expired license; or
   determining an absence of at least one license for the user for the received content item.

20. The system of claim 19, wherein the server enables further actions including offering a renewal to the user for at least one expired license for at least one type of use of the received content item.

21. The system of claim 15, wherein the server enables further actions including employing sales information to determine a current status of the user's license for at least one type of use for the received content item.

22. The system of claim 15, wherein the server enables further actions including providing hierarchical levels of trust to determine if a representative of the user is enabled to access information regarding the received content item for at least one license for at least one type of use.

23. The system of claim 15, wherein the server enables further actions including automatically pre-processing at least a portion of received content item stored in at least one location for at least one license for at least one type of use.

24. A network device for managing the use of content over a network, comprising:
   a memory for storing data;
   a processor for enabling actions based at least in part on the stored data; and
   an application that includes components, including:
   a first component for enabling the storing of at least one of a source digital fingerprint or a source identifier that corresponds to each of a plurality of items of source content, wherein at least one use of a copy of each source content item is licensable;
   a second component for determining if another identifier included with an item of content is received from a user indicating at least one particular type of use indicated by the user for the item of content, and has an affirmative correspondence to at least one of the stored source identifiers associated with each source content item;

a third component for determining if another digital fingerprint determined for the received content item is substantially similar to at least one of the source digital fingerprints associated with each source content item, if the determination of the correspondence of the other identifier to the stored source identifiers is negative;

a fourth component for determining each license previously provided for a user that corresponds to the received content item based on the affirmative correspondence between at least one of the source identifiers and the other identifier or a substantially similar comparison between the source digital fingerprints and the other digital fingerprint;

a fifth component for if a license for the user for the at least one particular type of indicated use for the received content item is unavailable, determining at least one other source content item that is non-identical to the received content item and that is both substantially equivalent to the received content item and available for licensing for the at least one particular type of indicated use by the user, wherein the determination of the at least one other source content item is based on at least the affirmative correspondence; and a sixth component for enabling the offering of the license for at least one type of use to the user for the at least one determined equivalent source content item.

25. The network device of claim 24, further comprising another component for providing the determined equivalent source content item to the user that accepted the offer for the license for at least one type of use for the equivalent source item.

26. The network device of claim 24, further comprising another component for enabling the display of information to the user regarding at least one of type of use for each determined license.

27. The network device of claim 24, further comprising another component for enabling at least one user to provide or select the received content item and at least one intended use for the received content item.

28. The network device of claim 24, wherein the fourth component enables further actions including:
  determining each current license for the user for at least one type of use of the received content item;
  determining each expired license for the user for at least one type of use of the received content item; or
  determining an absence of at least one license for the user for the received content item.

29. The network device of claim 28, further comprising another component that enables actions, including:
  enabling a renewal for the user for at least one expired license for at least one type of use of the received content item; or
  enabling an offering of a new license to the user for at least one use of the received content item.

30. The network device of claim 24, further comprising another component for employing sales information to determine a current status of the user's license for at least one type of use for the received content item.

31. The network device of claim 24, further comprising another component for providing hierarchical levels of trust to determine if a representative of the user is enabled to access information regarding at least one license for at least one type of use for the received content item.

32. The network device of claim 24, further comprising another component for automatically pre-processing at least a portion of received content item stored in at least one location for at least one license for at least one type of use.

33. The network device of claim 24, wherein the application is a client.

34. The network device of claim 24, wherein the application is a server.

35. A mobile device for managing the use of content over a network, comprising:
  a transceiver for communicating over a network;
  a memory for storing data;
  a processor for enabling actions based at least in part on the stored data; and
  an application that includes components, including:
  a first component for enabling the storing of at least one of a source digital fingerprint or a source identifier that corresponds to each of a plurality of items of source content, wherein at least one use of a copy of each source content item is licensable;
  a second component for determining if another identifier included with an item of content is received from a user indicating at least one particular type of use indicated by the user for the item of content, and has an affirmative correspondence at least one of the stored source identifiers associated with each source content item;
  a third component for determining if another digital fingerprint determined for the received content item is substantially similar to at least one of the source digital fingerprints associated with each source content item, if the determination of the correspondence of the other identifier to the stored source identifiers is negative;
  a fourth component for determining each license previously provided for a user that corresponds to the received content item based on the affirmative correspondence between at least one of the source identifiers and the other identifier or a substantially similar comparison between the source digital fingerprints and the other digital fingerprint;
  a fifth component for if a license for the user for the at least one particular type of indicated use for the received content item is unavailable, determining at least one other source content item that is non-identical to the received content item and that is both substantially equivalent to the received content item and available for licensing for the at least one particular type of indicated use by the user, wherein the determination of the at least one other source content item is based on at least the affirmative correspondence; and
  a sixth component for enabling the offering of the license for at least one type of use to the user for the at least one determined equivalent source content item.

* * * * *

UNITED STATES PATENT AND TRADEMARK OFFICE
CERTIFICATE OF CORRECTION

| | | |
|---|---|---|
| PATENT NO. | : 7,818,261 B2 | Page 1 of 1 |
| APPLICATION NO. | : 11/425335 | |
| DATED | : October 19, 2010 | |
| INVENTOR(S) | : David N. Weiskopf et al. | |

It is certified that error appears in the above-identified patent and that said Letters Patent is hereby corrected as shown below:

Title Page
On page 2, under Item [56] "OTHER PUBLICATIONS", in column 2, line 5, delete "converence" and insert -- conference --, therefor.

In column 10, line 32-44, delete "Applications 542 may include computer executable instructions which, when executed by mobile device 500, transmit, receive, and/or otherwise process messages (e.g., SMS, MMS, IM, email, and/or other messages), audio, video, and enable telecommunication with another computing device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 542 may further include browser 545 and content license program 543."
and insert the same below "device 500." in line 33 as a new paragraph.

In column 12, line 28-29, in claim 1, delete "for at the least" and insert -- for the at least --, therefor.

Signed and Sealed this
Fifteenth Day of March, 2011

David J. Kappos
*Director of the United States Patent and Trademark Office*